United States Patent [19]

Bauer

[11] Patent Number: 4,796,720
[45] Date of Patent: Jan. 10, 1989

[54] FOUR-WHEEL STEERING, LEVELING AND BANKING FOR VEHICLES

[76] Inventor: John K. Bauer, 510 Lenox Ave., Miami Beach, Fla. 33139

[21] Appl. No.: 142,642

[22] Filed: Jan. 11, 1988

Related U.S. Application Data

[63] Continuation-in-part of Ser. No. 99,395, Sep. 21, 1987, abandoned.

[51] Int. Cl.[4] .................. B62D 5/00; B62D 17/00; B60G 17/00
[52] U.S. Cl. ..................... 180/234; 180/140; 280/6 R; 280/91; 280/702; 280/661; 280/100
[58] Field of Search ................ 280/91, 661, 702, 100, 280/6 R; 180/234, 140

[56] References Cited

U.S. PATENT DOCUMENTS

| | | | |
|---|---|---|---|
| 2,910,131 | 10/1959 | Krotz | 180/45 |
| 3,255,840 | 6/1966 | Tangen | 180/45 |
| 4,289,214 | 9/1981 | Spence | 180/234 |
| 4,337,840 | 7/1982 | Bufler | 180/233 |
| 4,592,439 | 6/1986 | Collard et al. | 180/140 |
| 4,671,523 | 6/1987 | Naumann | 280/91 |
| 4,687,214 | 8/1987 | Uno | 280/91 |
| 4,690,431 | 9/1987 | Ito et al. | 280/91 |

Primary Examiner—Richard A. Bertsch
Attorney, Agent, or Firm—Thomas Schneck

[57] ABSTRACT

A steering and suspension system which steers and tracks all wheels of a vehicle and banks the vehicle body during turns. Front and rear power assisted rack and pinion steering assemblies are mechanically linked so that the rear wheels are turned in the opposite direction of the front wheels relative to the longitudinal axis of the vehicle. The power assistance turns the radially inward wheels to a greater degree than the radially outward wheels. A pendulous mass is suspended from the vehicle body to react to centrifugal force and is operationally linked to a camber and attitude adjustment spool valve to regulate fluid flow to front and rear camber pistons and to hydraulic shock absorbers. The spool valve responds to swing of the pendulous mass to channel fluid to the camber pistons which cause the vehicle wheels to lean into a turn. Moreover, the spool valve channels fluid to the shock absorbers that are radially outward of a curve to bank into a turn. The pendulous mass also reacts to gravitational pull to detect straight-line driving on a laterally sloped road, thereby affecting the spool valve to transmit fluid to the hydraulic shock absorbers which are associated with depressed side of the vehicle until the vehicle body is leveled.

9 Claims, 4 Drawing Sheets

FOUR-WHEEL STEERING, LEVELING AND BANKING FOR VEHICLES

CROSS REFERENCE TO RELATED APPLICATION

The present application is a continuation-in-part of application Ser. No. 099,395, filed Sept. 21, 1987, now abandoned.

TECHNICAL FIELD

The present invention relates in general to systems affecting the cornering characteristics of a motor vehicle and in particular to vehicle steering and suspension systems.

BACKGROUND ART

Four-wheel steering systems are receiving increasing attention from car manufacturers and from consumers. Four-wheel steering substantially increases the turning radius of a vehicle and increases high-speed handling. When a vehicle negotiates a turn, inertia urges the vehicle to continue in a straight line. With conventional front-wheel steering, the rear tires tend to slip away from the direction of turn of the front wheels. Slip angle of a tire is defined as the angle between the line of actual travel and the direction in which a wheel is pointed. Slip angle is obviously different between the rear wheels and the front wheels of front-wheel steering vehicles, since the rear wheels are locked in a position parallel to the longitudinal axis of the vehicle.

Slip angle increases if more cornering force is demanded, but slip angle is normally limited to a maximum of between ten and fourteen degrees, depending upon the tire design and the road surface. The force that keeps a vehicle on a road is the friction between the tire and the road, and a slip angle beyond fourteen degrees will overcome this friction to send a vehicle into a slide.

Even a small change in the angle of the rear wheels relative to the longitudinal axis of the vehicle will have a large effect upon the cornering characteristics of a car since slip angle is reduced. Vehicles having four-wheel steering are known. U.S. Pat. Nos. 2,910,131 to Krotz, 3,255,840 to Tangen, 4,289,214 to Spence, 4,337,840 to Bufler and 4,592,439 to Collard et al. disclose vehicles in which all four wheels are turned. But while four-wheel steering produces a quicker response, it is incapable of changing physical laws and, therefore, the limits of friction and the cornering force of tires remain unaffected.

High cornering forces create car body roll, thereby redistributing the weight toward the wheels that are radially outward of a steering center. Thus, side stress problems are a concern. Additionally, a wheel which is deflected by body roll from a normal axis of rotation will influence the vehicle's direction. When both front wheels or both rear wheels are deflected by roll, the roll-steer effect can be pronounced. The result is a vehicle which is less comfortable for the occupants of the vehicle.

A vehicle that changes direction well is considered to be a good handling vehicle, whereas a vehicle that does not change direction under certain conditions is termed as a stable vehicle. Both are desirable characteristics. Four-wheel steering improves the handling of a vehicle but it does not follow that stability is improved. Moreover, four-wheel steering does not, by itself, compensate for the variations in wheel rotational speed during turns. Such variations produce asynchronous gyroscopic forces.

An object of the present invention is to provide a steering and suspension system which improves the comfort and stability of the vehicle in addition to improving vehicle handling.

DISCLOSURE OF THE INVENTION

The above object has been met by a steering and suspension system which steers and tracks all four wheels while banking the vehicle body during cornering, and moreover, levels the vehicle body during straight-line driving. The steering and suspension system synchronizes the gyroscopic forces of the four wheels during turns.

A front rack and pinion steering assembly is mechanically linked to a rear rack and pinion steering assembly to steer all four wheels perpendicular to a point of a line extending from the center of the vehicle wheelbase. Both rack and pinion assemblies are power assisted and piston chambers associated with the power assistance are dimensioned such that the wheels radially inward of a curve are turned to a greater degree than the radially outward wheels. The rack and pinion assemblies each include a locking mechanism which restricts wheel movement when the steering wheel of the vehicle is positioned for straight-line driving. The locking mechanism and tracking of four wheels provides stability, while the power assisted four-wheel steering provides a substantial improvement in handling over conventional vehicles.

Stability and handling are further improved by utilization of front and rear camber adjustment assemblies. Each camber adjustment assembly includes a dual chamber hydraulic piston having a piston rod which controls positioning of camber adjustment arms. Repositioning of the camber adjustment arms causes rotation of a shaft having a cam member eccentrically located within the shaft. Each eccentric cam member is fixed to the associated lower control arm of the vehicle so that rotation of the shaft by the camber adjustment arms will result in a change of positioning of the control arms, thereby affecting the angle between the plane of rotation of each wheel and the vertical, (i.e. the camber angle).

The fluid flow to and from the dual chamber hydraulic piston is regulated by a pendulous mass which is fixed to the vehicle to swing along an arc substantially parallel to the transverse axis of the vehicle. Swing of the pendulous mass controls a three port spool valve that is in fluid communication with the hydraulic piston. Rotation of the spool valve by the pendulous mass in a first direction will pivot the wheels clockwise, while spool valve rotation in a second direction will pivot the wheels counterclockwise relative to the longitudinal axis of the vehicle. The operation of the camber adjustment assemblies causes the top of the wheels to lean toward the direction of cornering side force.

Rotation of the spool valve by swing of the pendulous mass also controls the vertical positioning of a vehicle frame relative to the four wheels. Attitude adjustment is provided by the shock absorbers associated with the four wheels. Each shock absorber is in fluid communication with the spool valve so that the spring mass (i.e., the mass supported by the shock absorbers) will bank during negotiation of a turn. That is, the spool valve will supply fluid to the shock absorbers associated with the right wheels during a left turn to bank the spring mass, thereby adding to the stability of the vehicle. Moreover, the pendulous mass will react to the force of gravity in the same manner as it does centrifugal force, so that the spring mass of a vehicle steered straight ahead on an unlevel road will be leveled. Leveling occurs by the supply of fluid to the shock absorbers associated with the lower pair of wheels until the pendulous mass is returned to a vertical position.

An advantage of the present invention is that it synchronizes the gyroscopic forces of the four wheels to provide banked, no-roll turns. Thus, both handling and stability are improved. Another advantage is that occupant comfort is further increased by leveling of the car body during straight-line driving. Another advantage is that a lesser degree of steering wheel rotation is required during sharp or high-speed turns than is required in conventional vehicles or even other four-wheel steering vehicles, since the pendulous mass is forced further along the arc of rotation as speed is increased or road turn is made more severe. Another advantage is the ease of parking provided by steering of the front and rear wheels in opposite directions.

BEST MODE FOR CARRYING OUT THE INVENTION

Figure 1:
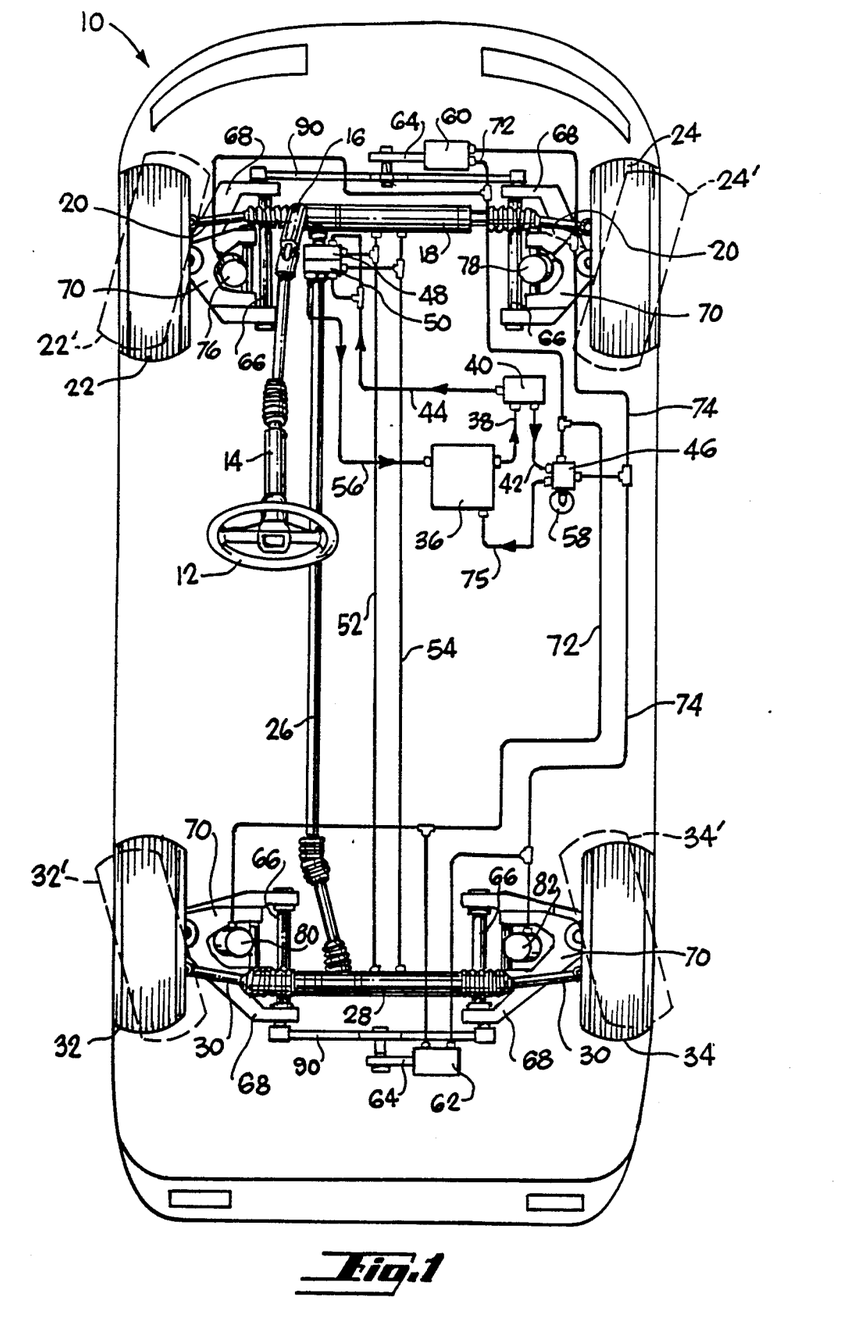
FIG. 1 is a top diagrammatic view of a vehicle having a steering and suspension system in accord with the present invention.

With reference to FIG. 1, a motor vehicle 10 is shown having a steering wheel 12 attached at the end of a steering column 14. The end of the steering column 14 distal the steering wheel 12 terminates in a gear box 16 which includes the pinion member of a power assisted front rack and pinion steering assembly 18.

The front rack and pinion steering assembly 18 is attached at opposed ends to tie rods 2 which pivot the left front tire 22 and the right front tire 24. A rear steering shaft 26 extends from the front rack and pinion steering assembly 18 to a power assisted rear rack and pinion steering assembly 28. The rear steering shaft 26 provides a mechanical linkage for rotation of a pinion, not shown, which drives the rear steering system 28. Tie rods 30 joined at the opposed ends of the rear steering assembly 28 pivot the left rear tire 32 and the right rear tire 34.

The front steering assembly 18 is positioned forward of the front tires 22 and 24. The rear steering assembly 28, on the other hand, is positioned rearward of the back tires 32 and 34. Thus, the front and rear tires are turned in a contra-phase, or circle mode, when the steering wheel 12 is manipulated, as shown by phantom tires 22', 24', 32' and 34'. The contra-phase positioning of wheels aligns each of the four wheels substantially perpendicular to a radius extending from a steering center. However, to ensure that the wheels are perpendicular to radii of the steering center, the radially inward wheels must be pivoted to a slightly greater extent than the radially outward wheels. As will be explained more fully below, with reference to FIG. 7, the front and rear steering assemblies 18 and 28 do pivot the radially inward wheels to a greater degree.

Optionally, the front and rear steering assemblies 18 and 28 may both be positioned within the wheelbase of the vehicle 10. Contra-phase steering would still be present. As a further alternative, one steering assembly may be positioned within the wheelbase while the other steering assembly is disposed outside of the wheelbase. Such positioning would, however, require inclusion of an idler gear within the mechanical linkage of the front and rear steering assemblies 18 and 28 in order to provide contra-phase steering. The positioning of the steering assemblies is best dictated by what is physically convenient in the design of the vehicle 10.

The power assistance to the front and rear rack and pinion steering assemblies 18 and 28 is provided by a hydraulic system supplied with power steering fluid by a power steering pump 36. The power steering pump 36 is a conventional pump which has a single feed line 38 leading to a junction box 40. From the junction box 40 hydraulic fluid is channeled through feed lines 42 and 44 to three spool valves 46, 48 and 50. The spool valve 48 is designed to regulate the flow of fluid both to and from the steering assemblies 18 and 28 to assist the steering force provided by manual rotation of the steering wheel 12. Fluid flow between the spool valve 48 and the steering assemblies 18 and 28 is through hydraulic line 52. In actuality, spool valve 48 is a pair of spool valves and hydraulic line 52 is a set of four lines, but the spool valve 48 and the hydraulic line 52 are illustrated as shown for purposes of diagrammatic clarity of FIG. 1. As will be explained more fully with reference to FIGS. 7 and 9, spool valve 50 locks the tires 22, 24, 32 and 34 within a turning arc of no greater than 15 degrees when the steering wheel 12 is positioned for straight-line driving. Fluid communication between the lock-up spool valve 50 and the steering assemblies 18 and 28 is through hydraulic line 54. Return line 56 channels fluid from the spool valves 48 and 50 back to the power steering pump 36.

The spool valve 46 is a camber and attitude adjusting spool valve. While the above-mentioned spool valves 48 and 50 are controlled by rotation of the steering wheel 12, the camber and attitude adjusting spool valve 46 is controlled by swing of a pendulous mass 58. The pendulous mass 58 is suspended from the spool valve 46 and is aligned to swing in response to centrifugal force when the vehicle 10 is turned. The pendulous mass 58 also swings in response to gravitational pull when one side of the vehicle 10 is positioned higher than the opposite side.

Swing of the pendulous mass 58 determines fluid flow to separate chambers of a front camber piston 60 and of a rear camber piston 62. In this manner the camber pistons 60 and 62 move piston rods 64 inwardly and outwardly to rotate adjustment shafts 66. The mechanical linkage between pistons 60 and 62 and the adjustment shafts 66 will be described more fully below with reference to FIGS. 2a and 2b.

Rotation of the adjustment shafts 66 causes lower control arms 68 to be displaced laterally. Thus, the vehicle wheels, to which tires 22, 24, 32 and 34 are affixed, will rotate to change the angle between the plane of rotation of the wheel and the vertical, (i.e., the camber angle). In straight-line driving a positive camber angle of 2° is preferred, whereas activation of the camber pistons 60 and 62 may vary the camber angle by as much as 18°. Fluid flow through hydraulic lines 72 will cause the tires to rotate in a clockwise direction, while fluid flow through hydraulic lines 74 will cause the tires to rotate in a counterclockwise direction, as viewed from a driver's perspective. Hydraulic fluid passes from the spool valve 46 to the power steering pump 36 via return line 75.

Hydraulic lines 72 and 74 also provide a fluid flow path between the spool valve 46 and shock absorbers 6, 78, 80 and 82. Each of the shock absorbers has an added chamber which when supplied with hydraulic fluid will raise the frame of the vehicle relative to the associated tire 22, 24, 32 and 34. Thus, in negotiating a curve, in addition to adjustment of the camber angle to cause the tires to lean into the turn, the sprung mass of the vehicle will bank into the turn. Banking is provided by pivoting of the pendulous mass 58 which causes hydraulic fluid to be supplied to the shock absorbers 76 and 80 radially outward of the turn and causes fluid to be drained from the radially inward shock absorbers 78 and 82, as dictated by the positioning of tires 22', 24', 32' and 34'.

It can be seen in FIG. 1 that the steering assemblies 18 and 28 are kept operatively separate from the camber and attitude adjustment assembly. Consequently, attitude adjustment is not limited to instances in which the steering wheel 12 is manipulated. A vehicle 10 that is traveling in a straight-line manner on a road which is laterally sloped will be leveled by the interaction of gravity and the pendulous mass 58. Gravitational pull will cause the pendulous mass 58 to pivot, thereby activating fluid flow to the shock absorbers 76–82 on the downhill side of the vehicle 10. The shock absorbers will raise the spring mass of the vehicle until the pendulous mass 58 is once again brought to a vertical position.

Figures 2, 2A:
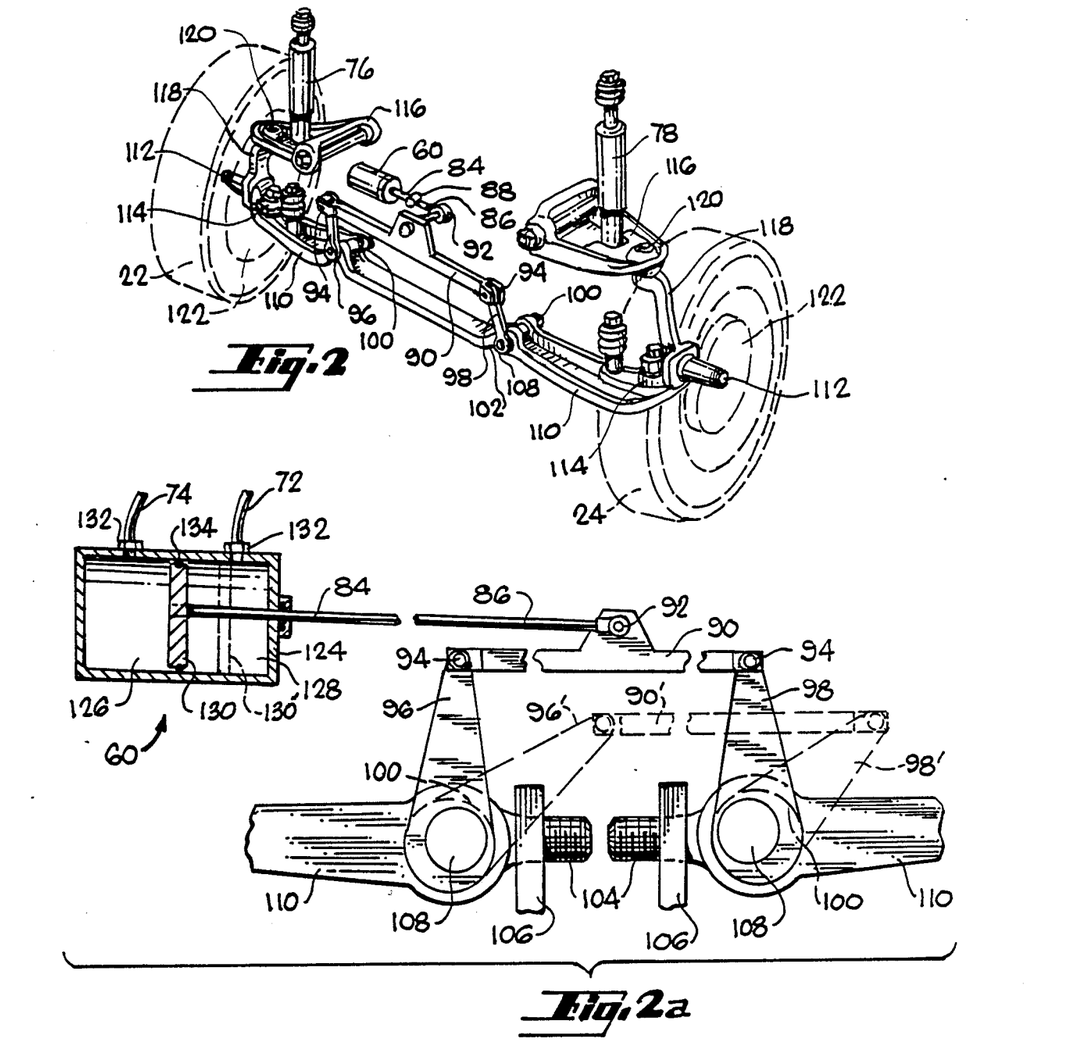
FIG. 2 is a perspective view of the camber and attitude adjustment,,assemblies of the vehicle of FIG. 1.
FIG. 2a is a rear view of the camber adjustment assembly of FIG. 2.

Referring now to FIGS. 2 and 2a, a front suspension is shown. The front suspension is operationally identical to the rear suspension. The front camber piston 60 includes a piston rod 84 pivotally attached to a linkage member 86 at a first coupling 88. The linkage member 86 is pivotally fixed to a camber arm bar 90 at a second coupling 92 opposite the first coupling 88. Opposite sides of the camber arm bar 90 are attached at pin and yoke connections 94 to a left camber adjustment arm 96 and a right camber adjustment arm 98.

The camber adjustment arms 96 and 98 each have a lower extremity fixed to a locating shaft 100, which is shown in phantom in FIG. 2a because the camber adjustment arms 96 and 98 act as face plates for the locating shafts 100. Pivoting of the camber adjustment arms 96 and 98 by the piston 60 will therefore rotate the locating shafts 100. But while the locating shafts 100 are permitted to rotate, the locating shafts 100 are prevented from moving laterally by mounting to a cross member 102, as shown in FIG. 2, and mounting through apertures in chassis brackets 104 secured to the vehicle chassis 106, as shown in FIG. 2a.

Eccentrically extending through each locating shaft 100 is a cam member 108. Since the cam members 108 are eccentrically positioned within the locating shafts 100, rotation of the locating shafts will result in lateral displacement of the cam members 108 relative to the vehicle chassis 106 and cross member 102. A lower control arm 110 is fixed to each eccentric cam member 108 so that lateral displacement of the cam member 108 will be translated to the lower control arm 110. In this manner, movement of the camber piston rod 84 controls the positioning of the lower control arms 110.

The lower control arms 110 are each secured to a spindle 112 at a lower ball joint 114. Upper control arms 116 are linked to the spindle 112 by attachment to a steering knuckle 118 at an upper ball joint 120. The upper control arms 116 are in a fixed lateral position relative to the vehicle frame. Thus, lateral movement of the lower control arms 110 will pivot the spindle 112 to change the angle between the plane of rotation of the vehicle wheels 122 and the vertical. That is, activation of the front camber piston 60 changes the camber angle of the left and right front tires 22 and 24.

The camber piston 60 comprises a housing 124, a first and second chamber 126 and 128, a piston member 130 and the piston rod 84. The hydraulic lines 72 and 74 from the camber and attitude spool valve, shown as spool valve 46 in FIG. 1, are connecting to the piston housing 124 at fittings 132. Injection of fluid from hydraulic line 74 will force piston member 130 to the right as indicated by 130' in FIG. 2a. As a result, the left and right camber adjustment arms 96 and 98 will be forced into the positions indicated as 96' and 98'. Pivoting of the camber adjustment arms 96 and 98 causes rotation of the locating shafts 100 which, because of the eccentric mounting of the cam members 108 within the locating shafts, results in lateral displacement of the lower control arms 110. The lateral displacement shown in FIG. 2a will angularly displace the tires 22 and 24 by counterclockwise rotation of the wheels 122 relative to the vehicle chassis. Injection of fluid through hydraulic line 72, on the other hand, forces the piston member to the left so as to rotate the tires 22 and 24 in a clockwise direction. Flow between piston chambers 126 and 128 is prevented by a seal 134 about the piston member 130.

Figure 3:
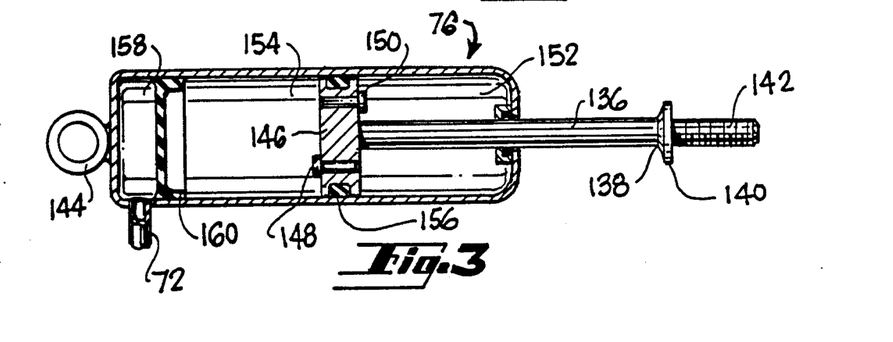
FIG. 3 is a side sectional view of a shock absorber of FIG. 2.

FIGS. 2 and 3 illustrate the front shock absorbers 76 and 78. Again, the rear suspension is operationally identical. The coil springs have been omitted from FIGS. 2 and 3 for purposes of clarity. The shock absorbers 76 and 78 are mounted to the upper control arms 116 but this is not critical. Each shock absorber includes a connecting rod 136 having a stop 138 for retention of a washer 140. The connecting rod 136 has a threaded end 142 which permits securement to a rod nut after insertion of the connecting rod into an upper mounting bracket, not shown, of a vehicle. A lower mounting bracket 144 is integral with the opposite end of the shock absorber 76.

The connecting rod 136 is attached to a dampening piston 146. The piston 146 operates conventionally, having a pair of valve 148 and 150 which allow the passage of fluid between first and second chambers 152 and 154 of the shock absorber. A piston seal 156 prevents leakage from one chamber to another other than through the valves 148 and 150. Passage of fluid between chambers acts to damp out vertical impulses given to vehicle wheels. In the absence of wheel movement the pressures above and below the dampening piston 146 balance to a static position of the dampening piston 146. The shock absorber includes a third chamber 158 which is separated from the second chamber 154 by a leveling piston 160. The third chamber 158 is in fluid communication with a hydraulic line 72. Fluid flow to and from the third chamber 158 will reposition the leveling piston 160 so that the static position of the dampening piston 146 is correspondingly changed. Thus, the leveling pistons 160 of the shock absorbers 76-82 determine the height of a vehicle's spring mass from the road.

Typically, the fluid of the first and second chamber 152 and 154 of the shock absorbers 76-82 is a hydraulic fluid. However, the shock absorbers may be hydropneumatic shocks. The dimensions of the third chamber 158 provide a volume which is equivalent to the first piston chamber 126 of the camber piston of FIG. 2a. Camber and attitude will therefore be affected identically by fluid flow through hydraulic line 72.

Figure 4:
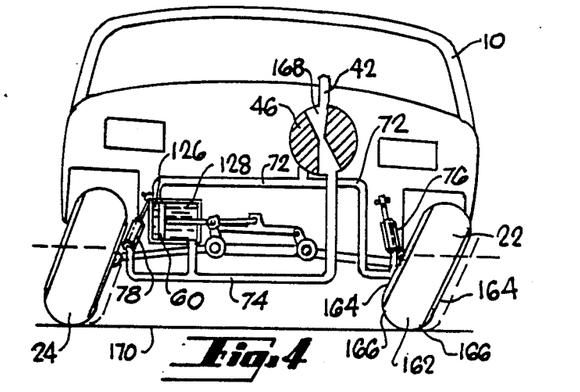
FIGS. 4 and 5 are front diagrammatic views of the present invention in operation.

Referring now to FIG. 4, a front view of a vehicle 10 is shown making a left turn. A tire 22 includes a crown portion 162, opposed side walls 164 and arcuate shoulder portions 166 which join the crown portion 162 to the side walls 164. Optimally, the crown portion is a wide wheel base and the shoulder portions 166 define 90° arcs. In negotiation of the left turn the spool valve 46 is caused to rotate. Spool valve rotation is provided by a pendulous mass, as will be described more fully below. Rotation of the spool valve 46 aligns the spool valve feed section 168 with the hydraulic line 74 Hydraulic fluid will flow from the feed line 42, through the spool valve 46 and into shock absorber 78 and the second chamber 128 of the front camber piston 60. Fluid flow to the shock absorber 78 will raise the side of the vehicle 10 which is radially outward of the turn. Consequently, the sprung mass of the vehicle will bank even on a level road 170 to provide a ride which is more stable and more comfortable. Moreover, the camber piston will rotate the tires to lean into the turn. In a static position the tires 22 and 24 are positioned at a positive camber angle of 2°. Then as the camber angle is adjusted during a turn, the radially inward tire 22, having the preset lean into the turn, will ride on the shoulder portion 166 of the tire. The camber may be adjusted to a maximum of 18°. Most curved roads are banked. Adjustment of the camber angle will allow the tires to track to a common center in the horizontal plane, thereby synchronizing the gyroscopic forces of the vehicle tires. The vehicle 10 of FIG. 4 is shown to be on a level road 170 only to clearly illustrate the banking of the sprung mass of the vehicle.

Figures 5, 6B, 6C, 6D, 6E:
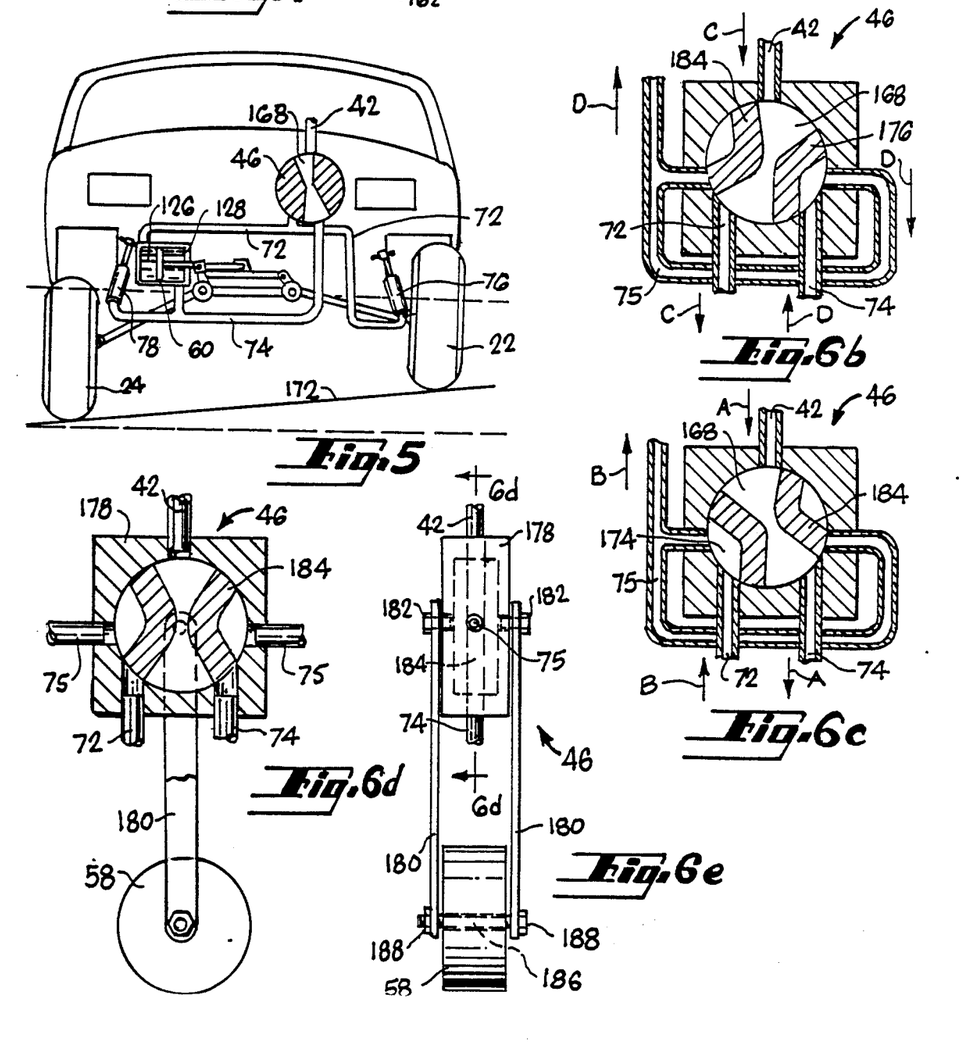
FIGS. 6a–6d are front sectional views of the valve assembly of FIG. 4.
FIG. 6e is a side view of the valve assembly of FIG. 6d.

FIG. 5 shows a vehicle 10 on a laterally sloped road 172. In negotiating a curve the camber and attitude adjustment spool valve 46 is rotated by the effect of centrifugal force on the pendulous mass. On a laterally sloped road 172, however, the spool valve is activated by the effect of gravity on the pendulous mass. On a road sloped such as that shown in FIG. 5, the spool valve is activated to channel fluid from the feed line 42, through the spool valve feed section 168 to the second chamber 128 of the camber piston 60 and to the shock absorber 78. The side of the vehicle will be raised by the front shock absorber 78 and by the shock absorber rearward of shock absorber 78 until the sprung mass of the vehicle is leveled. When the sprung mass is leveled, gravitational pull will return the pendulous mass to a vertical position, thereby deactivating the spool valve to prevent further flow to the shock absorber 78. At the same time, the camber piston 60 will adjust the camber angle.

Figure 6A:
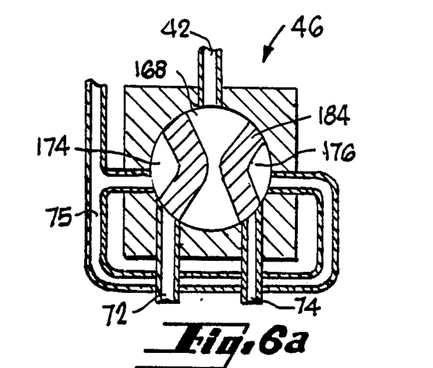

FIGS. 6a, 6b and 6c show the various positions of the camber and attitude adjustment spool valve 46. FIG. 6a illustrates a spool valve during straight line and level driving. FIG. 6b shows a spool valve during a right turn or during right-to-left leveling of a vehicle. Finally, FIG. 6c illustrates the positioning of the spool valve taken during the left turn of FIG. 4 or the left-to-right leveling of FIG. 5. To this point description of the spool valve has focused on feeding hydraulic fluid to the camber piston 60 and a shock absorber 76 and 78. For example, in the position of FIGS. 4, 5 and 6c, fluid flows from the feed line 42, through the spool valve feed section 168 and into hydraulic line 74, as indicated by Arrows A. However, simultaneous to the channeling of fluid to hydraulic line 74 is a drain of hydraulic fluid through the hydraulic line 72. Return line 75 is connected directly to the power steering pump of a vehicle, so that as the first return port 174 of the spool valve 46 places the hydraulic line 72 in fluid communication with the return line 75, fluid is passed through the first return port 174. Fluid is thus drained from the first chamber of the camber piston and from the shock absorber 76 via the spool valve 46, as indicated by Arrows B of FIG. 6c.

FIG. 6a shows the spool valve 46 in a straight-line and level driving condition. In this condition the feed line 42 is in fluid communication with neither of the hydraulic lines 72 and 74. Nor is fluid drained from the camber pistons or shock absorbers via the first return port 174 or a second return port 176. The spool valve positioning of FIG. 6b, on the other hand, is the opposite of that shown in FIGS. 4, 5 and 6c. Flow is through the feed line 42 and the spool valve feed section 168 to hydraulic line 72, as shown by Arrows C. Return flow is via the hydraulic line 74, second return port 176 and the return line 75, as indicated by Arrows D.

Referring now to FIGS. 6d and 6e, the pendulous mass 58 is suspended from the spool valve housing 178 by a pair of bars 180. The bars 180 are rotatably attached to the spool valve housing 178 by means of a connection assembly 182 that is secured to the valve member 184 for rotation therewith. Each bar 180 includes an aperture at a lower end to receive a shaft 186 having externally threaded ends for fastening to locknuts 188. The spool valve is fixed to the sprung mass of the vehicle so that centrifugal force will act upon the pendulous mass 58 when the vehicle negotiates a turn and gravitational pull will act upon the pendulous mass when the vehicle undergoes straight-line driving on a laterally sloped road. Because the pendulous mass 58 reacts to centrifugal force in directing fluid to the camber pistons and the shock absorbers, the influence of the present invention is made more dramatic at higher speeds. The steering and suspension system requires approximately 50% less steering wheel turn than a conventional vehicle operated at low-speeds and 75% less steering wheel turn than one operated at high speeds.

Figures 7, 8A, 8B, 8C, 9:
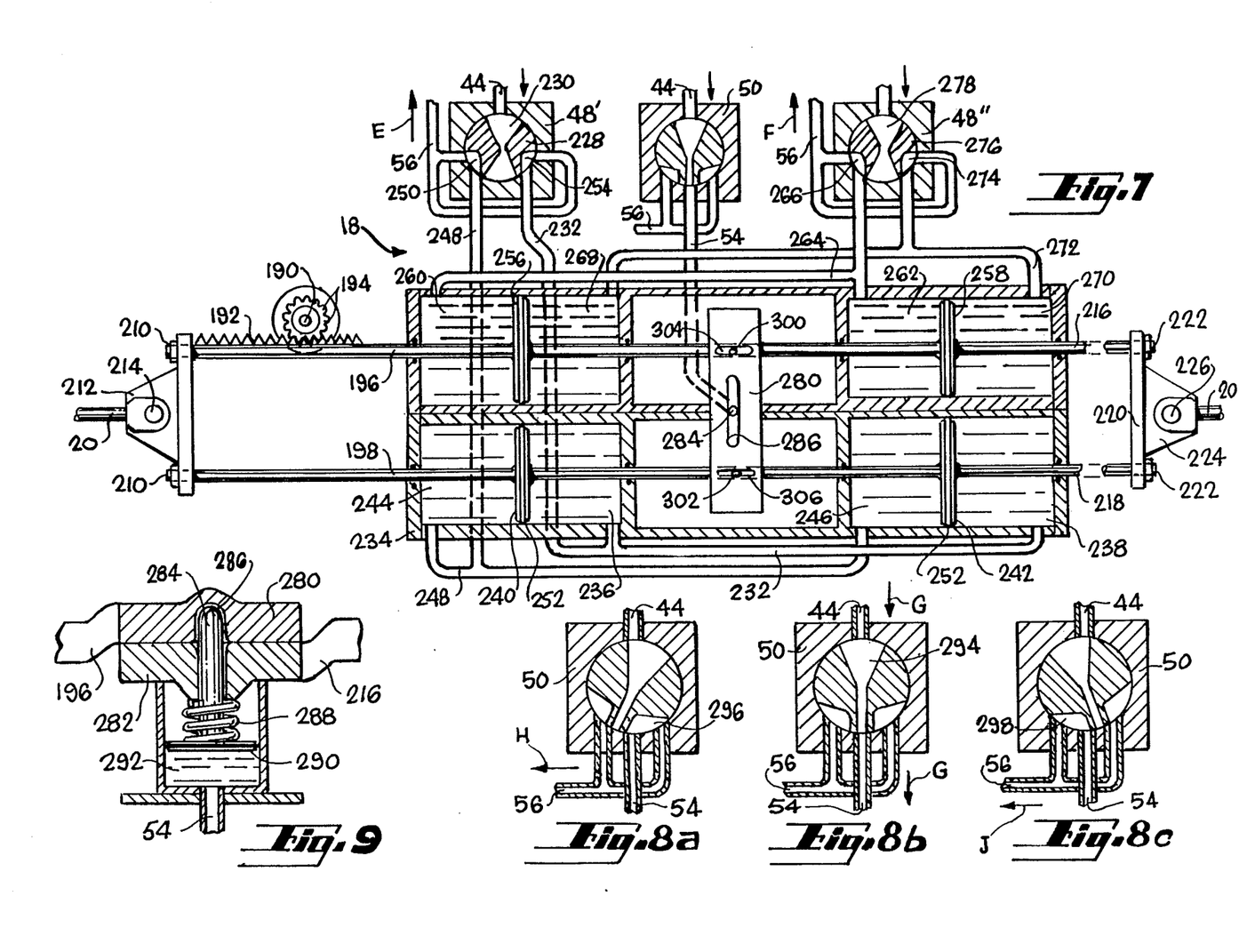
FIG. 7 is a rear front sectional view of the steering assemblies of FIG. 1.
FIGS. 8a–8c are rear sectional views of the valve of FIG. 7.
FIG. 9 is a top sectional view of a sliding couple joint of FIG. 7.

Referring now both to the rack and pinion steering assembly 18 of FIG. 7 and to FIG. 1 to show the interaction of the rack and pinion steering assembly with other assemblies, manipulation of the steering wheel 12 controls a pinion member 190 that meshes with the teeth of a rack structure 192. The pinion member 190 and the rack structure 192 are part of the power-assisted front rack and pinion steering assembly 18. The rear steering assembly 28 is operationally identical to the front steering assembly 18.

Rotation of the steering wheel 12 rotates the pinion member 190. Teeth 194 in the pinion member 190 mesh with the teeth of the rack structure 192. Consequently, rotation of the pinion member 190 results in movement of the rack structure 192. The rack structure 192 is integral with an upper left rack rod 196. The upper left rack rod 196 is parallel to a lower left rack rod 198 and each of the rack rods is fixed to an end plate 200 by fastening nuts 210 which receive the externally threaded ends of the left rack rods 196 and 198. The end plate 200 has a flanged portion 212 that is fixed to the end of a tie rod 20 by a pin 214. Thus, rotation of the pinion member 190 is translated into movement of the tie rod 20 so as to pivot a front wheel 22 of a motor vehicle.

At the opposite end of the assembly 18, an upper right rack rod 216 is fixed in parallel relation to a lower right rack rod 218 by attachment to an end plate 220. The right rack rods 216 and 218 are attached to the end plate 220 by fastening nuts 222, and a tie rod 20 is connected to a flanged portion 224 of the end plate by a pin 226. In this manner movement of the right rack rods 216 and 218 pivots the right front tire 24.

By attachment to the end plate 200, the left rack rods 196 and 198 are in fixed relation to each other. Similarly, the right rack rods 216 and 218 are in fixed relation to each other by attachment to the end plate 220. However, the upper left rack rod 196 is slidably coupled to the upper right rack rod 216, and the lower left rack rod 196 is slidably coupled to the lower right rack rod 218. Movement of the upper left rack rod 196 by rotation of the pinion member 190 will not, therefore, result in immediate movement of the upper right rack rod 216. Displacement of the right rack rods 216 and 218 are instead governed by hydraulic fluid flow through spool valves 48', 48" and 50. Spool valve 48' defines rack rod movement during negotiation of and return from a left turn. 48", on the other hand, defines rack rod movement that results from a right turn. The function of spool valve 50 will be described below.

Operation of spool valves 48', 48", and 50 are governed by a number of trips, much like those which turn off the turn signals of a motor vehicle after execution of a turn. Alternatively, manipulation of a steering wheel 12 may result in rotation of worm gears, not shown, to operate the spool valves 48', 48" and 50.

During straight-ahead driving, the positions of the spool valves 48', 48" and 50 are as shown in FIG. 7. Upon negotiation of a left turn, however, the rotatable valve member 228 at the center of spool valve 48' rotates in a counter-clockwise direction. In this manner, the hydraulic fluid feed line 44, which supplies fluid to the feed section 230 of the spool valve 48', is brought into fluid communication with power-assist line 232. Hydraulic fluid flows through the power-assist line 232 to a piston housing 234. The fluid thereafter enters into a first low-volume chamber 236 associated with the lower left rack rod 198, and into a first high-volume chamber 238 associated with the lower right rack rod 218. Insertion of fluid into the chambers 236 and 238 exerts pressures upon the pistons 240 and 242, respectively. The diameter of the low-volume chamber 236 is less than that of the high-volume chamber 238, so that the piston 240 mounted coaxially to the lower left rack rod 198 is moved to a greater extent than the piston 242 coaxially mounted to the lower right rack rod 218. During movement of the pistons 240 and 242, the fluid is evacuated from a second low-volume chamber 244 and also from a second high-volume chamber 246 via a power-assist line 248. The exiting fluid flows from the power-assist line 248, through a first return port 250 of the spool valve 48', and into hydraulic line 56 for return to the power steering pump, as shown by arrow E. Seals 252 on pistons 240 and 242 isolate chambers from one another.

The sliding coupling of lower left rack rod 198 to lower right rack rod 218 allows piston 240 to move to a greater extent than piston 242, as dictated by the dimensional difference between the low-volume chamber 236 and the high-volume chamber 238. Since the pistons 240 and 242 provide translation of motion to the associated rack rods 198 and 218 and also to tie rods 20, it follows that negotiation of a left turn results in a greater degree of pivoting by the left tire than that experienced by the right tire. Thus, all four wheels of a vehicle are maintained in a perpendicular position relative to a point of a line extending from the center of the vehicle wheel base. This assembly greatly improves the handling of a vehicle.

Returning the steering wheel of a vehicle from a left turn position to a position for straight-ahead driving trips the spool valve 48' for clockwise rotation of the valve member 228. Hydraulic fluid is thereby caused to flow from the first low-volume chamber 236 and from the first high-volume chamber 238 via the power-assist line 232. The fluid is evacuated from the power-assist line 232 through the second return port 254 of the spool valve 48' and into hydraulic line 56 for return to the power steering pump. That is, fluid flow is in a direction opposite of that described above. Again, the left tire of the vehicle will pivot to a greater extent than the right tire, to maintain each wheel in a perpendicular orientation relative to the center of a turn.

To this point motion of the upper rack rods 196 and 216 has been disregarded. Like the lower rack rods 198 and 218, the upper rack rods 196 and 216 are primarily governed by motion of pistons 256 and 258, with the upper left rack rod 196 also being controlled by rotation of the pinion member 190. However, as a result of attachment to the end plates 200 and 220, the upper rack rods 196 and 216 become the slaves of the lower rack rods during negotiation of the left turn described above. The upper rack rods 196 and 216 are associated with piston assemblies similar to those which control lower rack rods 198 and 218. Piston 256 is coaxially mounted to upper left rack rod 196 and piston 258 is coaxially mounted to upper right rack rod 216. During negotiation of a left turn, the upper piston assemblies are slaves to motion of lower rack rods 198 and 218, as lateral translation of the pistons 256 and 258 determine fluid flow in the piston chambers adjacent the pistons. That is, rather than fluid flow in the piston chambers providing pressure for displacement of the pistons 256 and 258, lateral displacement of the pistons provides pressure for evacuating fluid from the piston chambers.

In negotiating a left turn, pistons 256 and 258 are pulled or pushed to the left, as viewed in FIG. 7. Fluid is evacuated from a high-volume chamber 260 and from a low-volume chamber 262 via a power-assist line 264. For purposes which will become clear below, the position of the high-volume chamber 260 relative to the low-volume chamber 262, is the reverse of the chambers associated with pistons 240 and 242. Exiting fluid from chambers 260 and 262 proceeds from the power-assist line 264 through a first return port 266 of the spool valve 48". In contrast, lateral displacement of the pistons 256 and 258 to the right evacuates fluid from chambers 268 and 270 via a power-assist line 272 and a second return port 274 of the spool valve 48". Like the spool valve 48', the spool valve 48" includes a rotatable valve member 276, but the valve member of spool valve 48" is held stationary during negotiation of a left turn.

In executing a right turn, the operation of the steering assembly 18 is substantially identical to the procedure described above but is controlled by rotation of the valve member 276 in the spool valve 48". Clockwise manipulation of a steering wheel of a vehicle results in clockwise rotation of the valve member 276. Hydraulic fluid is thereby channeled from a feed line 44 through a feed section 278 of the valve member 276 and into power-assist line 264. Fluid flow from the power-assist line 264 enters the high-volume chamber 260 and the low-volume chamber 262. The piston 258 associated with the upper right rack rod 216 receives a greater pressure from the fluid in the low-volume chamber 262 than that pressure which is exerted onto piston 256. Consequently, the upper right rack rod 216 is moved further than upper left rack rod 196, and the radially inward right tire of a vehicle will be pivoted to a greater extent than the radially outward left tire. Fluid is evacuated from chambers 268 and 270 through power-assist line 272, whereafter the fluid passes through the second return port 274 of the spool valve 48". From the second return port 274 the fluid is issued back to the power steering pump through hydraulic line 56, as indicated by arrow F. Returning the vehicle steering wheel to a position for straight-ahead driving trips the valve member 276 in a counterclockwise direction in order to move the pistons 256 and 258 leftwardly. During this entire time spool valve 48' is held stationary in the position shown in FIG. 7.

Referring now to FIGS. 7-9, left rack rods 196 and 198 are interconnected at outer ends to the end plate 200. The rack rods 196 and 198 are also joined at inner ends by common attachment to a coupling plate 280. In the top view of FIG. 9, only the upper left rack rod 196 may be seen, as the lower rack rod 198 is positioned below rack rod 196. Similarly, the right rack rods 216 and 218 are joined to a second coupling plate 282, seen in FIG. 9. Lower right rack rod 218 is positioned below the rack rod 216. During execution of a turn, a reciprocating dog 284 is extracted from the slot 286 of the first coupling plate 280. Extraction of dog 284 from slot 286 permits the plates 280 and 282 to slide across each other so as so provide the slidable coupling of opposed rack rods described above. Thus, the tie rods 20 at opposed ends of the steering assembly 18 are able to move unequal amounts.

A spring 288 biases the reciprocating dog 284 for extraction from the slot 286 of coupling plate 280. As seen in FIG. 9, however, the force of spring 288 may be overcome by injection of hydraulic fluid against the face of a piston 290 opposite the face of the piston in contact with spring 288. By overcoming the force of 288 the reciprocating dog 284 is inserted into slot 286 so that all four rack rods 196, 198, 216 and 218 are locked for common movement.

The bias of the spring 288 is overcome during straight-line driving by the channeling of hydraulic fluid through spool valve 50 into the piston chamber 292 at the face of piston 290. The spool valve 50 shares the feed and return lines 44 and 56 with spool valves 48' and 48". FIGS. 8a-8c illustrate the various positions of the spool valve 50 for controlling the reciprocating dog 284 of FIG. 9. The spool valve 50 is referred to as a lock-up spool valve since it channels fluid to lock the rack rods 196, 198, 216 and 218 during a 12° to 15° range during straight-line steering. When the vehicle's steering wheel is in a neutral position, the position of the lock-up spool valve 50 is that shown in FIG. 8b. Here, fluid flows from the feed line 44, through the spool valve feed section 294 to the hydraulic line 54, as indicated by arrows G of FIG. 8b. No flow occurs through return line 56. Then, as the steering wheel is rotated there is a small delay before fluid is drained from fluid line 54, but if the degree of steering wheel rotation is sufficient, drainage does occur. The delay defines the range of rack rod locking.

Drainage through the hydraulic line 54 allows the spring 288 to overcome the force of the hydraulic fluid. FIG. 8a shows the lock-up spool valve during a right turn, with drainage from the piston chamber 292 through hydraulic line 54 and first port 296 for exit via return line 56, as shown by arrow H. FIG. 8c illustrates a left hand turn, with a second return port 298 of the spool valve 50 providing fluid communication of the hydraulic line 54 with the return line 56. Consequently, the lock-up spool valve 50 insures that the rack rods 196, 198, 216 and 218 are locked together during straight-line driving, but permits the left rack rods 196 and 198 to move a greater or lesser distance than the right rack rods 216 and 218 during execution of a turn.

Referring to FIG. 7, the coupling plate associated with rack rods 216 and 218 includes safety pins and 302 which project into elongated openings 304 and 306 of the coupling plate 280 associated with the left rack rods 196 and 198. The safety pins 300 and 302 provide the necessary steering maneuverability in case hydraulic pressure to the steering assembly 18 is lost. In a situation in which hydraulic pressure does not provide steering force to the right rack rods 216 and 218, such steering force will be transferred from the rack-and-pinion driven left rack rods 196 and 198 by means of contact of the safety pins 300 and 302 against a left or right extremity of the elongated apertures 304 and 306, respectively.

In operation, the vehicle includes four-wheel steering, banking, leveling and tracking. Referring to all of the figures in general but FIG. 1 in particular, the four-wheel steering is provided by the power assisted front and rear rack and pinion steering assemblies 18 and 28. In straight-line driving the tires 22, 24, 32 and 34 maintain a positive camber angle of 2°, the vehicle frame is level and the right tie rods 20 and 30 are locked mechanically to the left tie rods 20 and 30 by the reciprocating dogs 284 shown in FIG. 9.

However, as the vehicle 10 initiates a right-hand turn, the camber angle will be changed by fluid flow from camber and attitude adjustment spool valve 46 to the front and rear camber pistons 60 and 62. Fluid flow is initiated by swing of the pendulous mass 58 as centrifugal force from the turn acts upon the pendulous mass to reposition the spool member 184 shown in FIGS. 6a-6e. The eccentric connection of members causes actuation of the camber pistons to rotate the tires 22, 24, 32 and 34 so as to lean into the turn. The radially inward tires 24 and 34, because of the initial positive camber angle setting, pick up a smaller diameter shoulder portion 166 of the tires and no variation in rotational speed among the four wheels will occur.

Simultaneous to the camber adjustment, fluid flow from the spool valve 46 will also bank the sprung mass of the vehicle 10. The positioning of the spool valve channels fluid to the radially outward shock absorbers 76 and 80 and drains fluid from the radially inward shock absorbers 78 and 82. Moreover, steering beyond a 12° to 15° range will cause the reciprocating dog 284 to unlock the left tie rods 20 and 30 from the right tie rods. The power assist system will therefore be free to turn the radially inward tires 24 and 34 to a greater extent than the radially outward tires 22 and 32. The unequal turning of tires is designed to maintain all four tires in a position perpendicular to the center of a turn.

While the present invention has been described as including a pendulous mass 58 which activates the camber and attitude adjustments, a microswitch connected to a reversible hydraulic fluid pump may be substituted. It has been discovered, however, that the pendulous mass is more accurate. Alternatively, activation may be provided by linking the camber and attitude adjustment spool valve 46 to rotation of the vehicle steering wheel, much like the other spool valves 48', 48" and 50. Such linkage would not, however, realize the proper conditions. The pendulous mass is preferred since it reacts to centrifugal force to recognize a banked road, increased vehicle speed and a laterally sloped road.

The drawings illustrate the steering and suspension system of a passenger vehicle, but the present invention may be adopted for buses, trucks and other vehicles.

I claim:

1. A vehicle having a steering wheel, a frame, left and right front wheels, and left and right rear wheels, said frame having a longitudinal axis and a transverse axis, comprising,
   a front steering means operatively linked to a steering wheel for turning left and right front wheels in response to rotation of said steering wheel,
   a rear steering means operatively linked to said steering wheel for turning left and right rear wheels in response to rotation of the steering wheel,
   front camber adjustment means operatively linked to said front wheels for transmitting rotary rotation to said left and right front wheels, said front camber adjustment means including a left suspension arm attached to the left front wheel and a right suspension arm attached to the right front wheel, said left and right suspension arms each pivotally connected to a vehicle frame opposite the associated wheel, said front camber adjustment means being responsive to a fluid working medium to cause rotary motion of aid front wheels relative to the longitudinal axis of the vehicle frame,
   rear camber adjustment means operatively linked to said rear wheels for transmitting rotary motion to said left and right rear wheels, said rear camber adjustment means including a left suspension arm attached to the left rear wheel and a right suspension arm attached to the right rear wheel, said left and right suspension arms each pivotally connected to the vehicle frame opposite the associated wheel, said rear camber adjustment means responsive to a fluid working medium to cause rotary motion of said rear wheels relative to the longitudinal axis of the vehicle frame,
   attitude adjustment means connecting said front and rear wheels to said vehicle frame for controlling the distance between a wheel and said vehicle frame, said attitude adjustment means actuated by a fluid working medium,
   supply means for providing said fluid working medium,
   valve means for directing fluid flow of said fluid working medium between said supply means on the one hand and said front and rear adjustment means and said attitude adjustment means of the other hand, and
   a pendulous mass pivotally suspended from said vehicle frame and operatively connected to said valve means for regulating the orientation of each wheel, said pendulous mass disposed to pivot in response to the magnitude of lateral acceleration of a vehicle and in response to the vertical position of the right front and rear wheels relative to the left front and rear wheels.

2. The vehicle of claim 1 wherein said front and rear steering means each include a pinion member and a rack member, said pinion members each connected to the steering wheel to respond to rotation of said steering wheel, said rack members each being axially movable in response to rotation of the associated pinion member to effect pivoting of the associated pair of wheels.

3. The vehicle of claim 2 wherein said front steering means is mechanically linked to said rear steering means to synchronize rotation of said pinion members.

4. The vehicle of claim 2 wherein said front and rear steering means each include a power assisted means to assist the steering force of a rotatable steering wheel, said steering assistant means including a plurality of cylinders in fluid communication with said supply means for providing a fluid working medium, said cylinders being dimensioned to effect a greater degree of turn at the wheels radially inward of a vehicle turn resulting from steering wheel rotation, the radially outward wheels being pivoted to a lesser degree.

5. The vehicle of claim 4 wherein said front and rear steering means each include a left and right tie rod, said left tie rod connected to the left tire and said right tie rod connected to the right tire, said left tie rod being slidably linked to said right tie rod, said front and rear steering means each having a locking means for securing said left tie rod to said right tie rod when said vehicle is steered in a direction substantially parallel to the longitudinal axis of the vehicle frame.

6. The vehicle of claim 1 wherein said attitude adjustment means includes a plurality of hydraulically adjustable shock absorbers, each wheel being associated with at least one shock absorber.

7. The vehicle of claim 1 wherein each camber adjustment means includes a hydraulically operated camber piston in motion transfer engagement with a first and a second control arm, said pendulous mass regulating fluid flow to and from said camber piston to effect angular displacement of a left and right wheel in response to lateral acceleration of said vehicle.

8. The vehicle of claim 7 wherein said rotation transfer engagement of said camber piston to said first and second control arms includes eccentric mounting of said control arms to frame brackets, said frame brackets being fixed to said vehicle frame.

9. The vehicle of claim 1 wherein said rear steering means turns said rear wheels in a direction to provide a steering angle of the same magnitude but opposite direction of the front wheels relative to the longitudinal axis of the vehicle frame.

* * * * *

UNITED STATES PATENT AND TRADEMARK OFFICE
CERTIFICATE OF CORRECTION

PATENT NO. : 4,796,720

DATED : January 10, 1989

INVENTOR(S) : John K. Bauer

It is certified that error appears in the above-identified patent and that said Letters Patent is hereby corrected as shown below:

Column 3, line 30, "attitude adjustment,,assemblies of the vehicle should read - - attitude adjustment assemblies of the vehicle - -.

Column 3, line 57, "ends to tie rods 2 which" should read - - ends to tie rods 20 which - -.

Column 5, line 21, "and shock absorbers 6, 78" should read - -and shock absorbers 76, 78 - -.

Column 7, line 29, "hydraulic line 74 Hydraulic" should read - - hydraulic line 74. Hydraulic - -.

Column 12, line 30, "includes safety pins and 302 which" should read - - includes safety pins 300 and 302 which - -.

Claim 1, column 13, line 48, "motion of aid front wheels" should read - - motion of said front wheels - -.

Signed and Sealed this

Thirteenth Day of February, 1990

Attest:

JEFFREY M. SAMUELS

*Attesting Officer*    *Acting Commissioner of Patents and Trademarks*